United States Patent [19]

Benton et al.

[11] 4,289,651

[45] Sep. 15, 1981

[54] SUPPORTED CATALYSTS FOR THE POLYMERIZATION OF ALPHA-OLEFINS

[75] Inventors: Kenneth C. Benton, Garfield Hts.; James R. Mooney, South Russell; Raymond J. Weinert, Jr., Garfield Hts., all of Ohio

[73] Assignee: The Standard Oil Company, Cleveland, Ohio

[21] Appl. No.: 106,078

[22] Filed: Dec. 20, 1979

[51] Int. Cl.³ .............................................. C08F 4/02
[52] U.S. Cl. ........................... 252/429 B; 252/431 R; 526/128; 526/127
[58] Field of Search .................. 252/429 B, 431 R

[56] References Cited

U.S. PATENT DOCUMENTS

| | | | |
|---|---|---|---|
| 3,620,981 | 11/1971 | Macoon et al. | 252/429 B |
| 3,956,179 | 5/1976 | Sebestian et al. | 252/431 R X |
| 4,034,139 | 7/1977 | Mazarguil et al. | 252/431 R X |
| 4,098,979 | 7/1978 | Maemoto et al. | 252/429 B X |
| 4,105,847 | 8/1978 | Ito et al. | 252/429 B X |

*Primary Examiner*—Patrick Garvin
*Attorney, Agent, or Firm*—William D. Mooney; Herbert D. Knudsen; Larry W. Evans

[57] ABSTRACT

This invention relates to a new supported catalyst and to the use of this catalyst in a process for the polymerization of alpha-olefins. The catalyst comprises a transition metal complex supported on a planar organosilicon polymer which has been derived from at least one of chrysotile and apophyllite. The support is prepared by the leaching of the metal ions from the mineral and substitution of some of the silanol groups with alkyl silyl groups. Particularly active catalysts can be prepared by treating the planar organosilicon polymer with silicon tetrachloride prior to contacting the polymer with a transition metal complex.

7 Claims, No Drawings

SUPPORTED CATALYSTS FOR THE POLYMERIZATION OF ALPHA-OLEFINS

BACKGROUND OF THE INVENTION

The polymerization of alpha-olefins by transition metal complexes, i.e. Ziegler-type catalysts, has been practiced since the 1950's. Over the years many support materials such as silica, alumina, Group IIA metal halides and hydroxy halides, have been used with Ziegler-type catalysts. However, catalysts containing these support materials require careful and extensive preparation procedures. Moreover, there is still a need for catalysts which are more active and which produce more highly stereo regular polymers.

The practice of the instant invention offers many advantages including: (1) the supports are derived from inexpensive and readily available minerals; (2) the preparation of the support requires only moderate conditions and unsophisticated equipment and techniques; (3) the application of the catalyst to the support is easily accomplished; (4) the required milling time is significantly reduced; (5) the catalysts produced herein are more active than prior art catalysts; (6) the inventive catalysts produce more highly stereo regular polymers than prior art catalysts; and (7) the instant catalysts are less sensitive to oxygen and water than prior art catalysts.

SUMMARY OF THE INVENTION

This invention relates to a novel supported catalyst comprising a transition metal complex catalyst supported on a planar organosilicon polymer which has been derived from at least one of chrysotile and apophyllite.

Moreover, this invention relates to a process for polymerizing alpha-olefins comprising contacting an alpha-olefin with the above catalyst.

DETAILED DESCRIPTION

Transition metal complex catalysts, i.e. Ziegler-type catalysts, in general, are prepared by the reaction of transition metal compounds with organo-metallic compounds. These solid heterogeneous catalysts contain active sites which polymerize alpha-olefins to high molecular weight polymers and which also control the manner of monomer addition. Generally speaking, each new alpha-olefin molecule is incorporated in the polymer chain in a manner identical to that of the preceeding molecule. This leads to regularity in structure and allows the polymer to crystallize.

These Ziegler catalysts may be formed by bringing together a transition metal compound in which the transition metal is in a valence state below its normal maximum, for example, titanium trichloride, and an organo-metallic compound, for example, aluminum diethylmonochloride, which functions principally as an activator for the transition metal compound. Many forms of Ziegler catalysts have been proposed and, as is well known in the art, there are many transition metal compounds and organo-metallic compounds which may be used to form Ziegler catalysts. Such catalysts may comprise more than one transition metal compound in combination with one or more organo-metallic compounds.

Any transition metal compound in which the transition metal is present in a valence state below its normal maximum and which can function as an olefin polymerization catalyst may be used in carrying out the present invention. Preferably, transition metal halides, alkoxides and alkyls may be used in this invention, wherein the transition metal is at least one of zirconium, vanadium, rhodium, hafnium, titanium and chromium. It is generally preferred to use titanium trichloride as the transition metal compound.

The organo-metallic component is based on an element selected from the Group IA, IIA and IIIA of the Periodic Table and will usually be an aluminum compound. Preferably, the aluminum compound is an alkyl aluminum halide or an aluminum trialkyl wherein each alkyl chain contains less than 8 carbon atoms. Suitable aluminum compounds are aluminum triethyl, aluminum tri-n-propyl, aluminum tri-iso-butyl, aluminum diethylmonochloride and aluminum tri-n-hexyl.

These catalysts may be treated with a wide range of electron donors, including ethers, amides, esters, alkyl halides, halogens, interhalogen compounds, phosphines, phosphonitriles, alcohols, thiols, and thioethers which enhance the catalyst activity or stereo regularity. These additives are well known in the art.

This invention provides a novel support for these Ziegler-type catalysts. The transition metal complex can be applied to the support by any of the convenient methods known in the art. Two such methods are either ball-milling the support with the transition metal complex or applying a solution of the transition metal complex to the support. The transition metal complex may be applied directly to the support or the transition metal alone can be added to the support with the complex being formed subsequently by the addition of the organo-metallic compound.

The supports are derived from silicate minerals, i.e. chrysotile and apophyllite, by treating them by one or more reaction mixtures which leaches out the mineral component and substitutes alkyl silyl groups for some of silanols. The preparation and structure of planar organo-silicon polymers derived from chrysotile and apophyllite is well known in the prior art and is described in the following reference: J. P. Linsky, T. R. Paul and M. E. Kenney, *J. Polymer Science:* Part A-2, Vol. 9, pgs. 143 thru 160 (1971).

One method by which the support derived from chrysotile can be prepared is to disperse chrysotile in water and then dry for 18 to 24 hours at about 50° C. to 60° C. under reduced pressure. This chrysotile is then treated with a reaction mixture consisting of 2-propanol, chlorotrimethylsilane and concentrated hydrochloric acid in a sealed reactor at 70° C. for about 96 hours. The product is then washed alternately with water and methanol to free it of the reaction mixture, given a final water wash, and dried at 55° C. under reduced pressure for approximately 18 hours.

A support derived from apophyllite can be prepared by grinding apophyllite to less than 50 mesh in a ball-mill and treating this material with a reaction mixture consisting of acetone, distilled water and chlorotrimethylsilane in a sealed reactor for 8 hours at 70° C. The product is recovered by centrifugation and washed with methanol by decantation. The product is then dried at elevated temperatures under reduced pressure for about 18 hours.

The above two examples are illustrative. There are many variations. For example, the temperature may be varied from approximately 20° C. to 200° C., although it is preferable to operate between 50° C. and 150° C. and especially between 70° C. and 120° C. If desired, higher boiling solvents, e.g. ethylene glycol and 3-pentanone may be substituted for the 2-propanol and acetone. Moreover, sulfuric acid or another strong, preferably non-oxidizing, acid may be substituted for the hydrochloric acid in the organosilicon polymer preparation.

The degree of substitution may be regulated by the selection of the reaction temperature and time, or alternatively, by replacing all, or a portion, of the chlorotrimethylsilane with a silane having at least one bulky alkyl group, such as t-butyl dimethyl chlorosilane. If desired, functional groups may be grafted onto the sheet silicates by the use of agents such as 3-cyano propyl dimethylchlorosilane, 4-amino butyl dimethylmethoxysilane and bis(chloromethyl)tetramethyldisiloxane.

The differences between the sheet silicates obtained from chrysotile and apophyllite are principally in the degree of substitution obtainable and in the morphology of the sheet. Although fairly long reaction times are required, chrysotile organosilicon polymers having degrees of substitution of up to 50% are obtained routinely without resorting to stringent conditions when using chlorotrimethylsilane. Apophyllite organosilicon polymers having degrees of substitution up to about 30% to 35% can also be obtained under mild conditions. Higher degrees of substitution of apophyllite polymers is possible but a second reaction stage under more stringent conditions is required.

Prior to use, the supports are preferably dried at 60° C. to 150° C. under reduced pressure for 18 to 24 hours. All preparations are conducted under an inert atmosphere. If desired, the organosilicon polymer support may be treated with an organo-metallic compound before the application of the transition metal compound.

It has also been discovered that treating the organosilicon polymer with a multi-chloride selected from the group consisting of Si, Ge, Sn, Pb, P, As, Sb and Bi chloride prior to its use as a support results in a particularly effective catalyst. Preferably, the chloride is selected from the group consisting of Si, Sb and As chlorides with $SiCl_4$ being most preferred. The organosilicon polymer can be treated with the chloride by placing the polymer in an inert atmosphere, adding the chloride, and then heating the mixture.

This invention is particularly applicable to propylene and ethylene polymerization and copolymerization. However, other alpha-olefins including 1-butene, 4-methyl-1-pentene, 5-ethylidiene-2-norbornene, butadiene-1,3 and isoprene can also be polymerized by the instant process.

The instant polymerization of an alpha-olefin can be conducted by any of the methods known in the prior art. Thus, this polymerization can be carried out either batchwise or continuously. The pressure to be employed in the polymerization may be varied over a wide range of from atmospheric pressure to 25 atmospheres, preferably from atmospheric to 10 atmospheres. Temperatures may be chosen within the usual range of from −20° C. to =160° C., preferably between 0° C. and 80° C.

SPECIFIC EXAMPLES

The following examples demonstrate the advantage of the instant invention for the formation of polypropylene.

EXAMPLE 1

2.36 gms. of a chrysotile organosilicon polymer were slurried with excess neat titanium tetrachloride at approximately 20° C. and agitated gently for approximately 66 hours. The product was washed with pure n-heptane until free of excess titanium tetrachloride, and then dried on the filter under argon. The resulting product was 5 weight percent titanium. 0.5 gms. of this product was then ball-milled for 48 hours under argon. The ball-milled product was slurried in 50 ml. of pure n-heptane and 0.5 ml. of a 25% solution of triethylaluminum in n-heptane was added at 21° C. The reaction mixture was held at 5° C. for 16 hours, then heated to 160° C. for 1 hour and held at 160° C. for 2 hours. The slurry was then cooled to ambient temperature, filtered under argon and the solids were washed with about 200 ml. of n-heptane.

The solids were reslurried in 50 ml. of n-heptane and 0.5 ml. of titantium tetrachloride was added. The mixture was heated to 160° C. in approximately 1 hour, held for 1 hour at 160° C., and cooled to ambient temperature over 1 hour. The product was recovered by filtration and washed with 200 ml. of n-heptane.

This product was then charged to a 7 oz. soda pop bottle, 50 ml. of n-heptane was added, and the bottle was capped. 15 gms. of propylene were injected into the bottle, followed by 13.9 ml. of 25% triethylaluminum solution in n-heptane. The system was heated and agitated at 70° C. for 16 hours. They yield was 12.45 gms. of product, 60% of which was insoluble in hot n-heptane.

EXAMPLE 2

0.47 gms. of an apophyllite organosilicon polymer was treated with 15 ml. of a 2.7 molar solution of n-butyl magnesium chloride in tetrahydrofuran. The mixture was heated to 70° C. for 2 hours, diluted with n-heptane, and the solid product was recovered by centrifugation. The product was then washed with n-heptane, filtered and dried on the filter. Magnesium content was 5.4 weight percent.

This product was treated with 10 ml. of neat titanium tetrachloride for 2 hours at 70° C. The resulting yellow-green solid was recovered by filtration under argon, washed with approximately 350 ml. of n-heptane, and dried on the filter. This titanium/magnesium product was 8.9% titanium and 4.6% magnesium by weight.

0.50 gms. of this product was slurried in 50 ml. of n-heptane under argon and 0.52 ml. of 25% diethylaluminum chloride solution in n-heptane was added at ambient temperature. The system was agitated at ambient temperature for 3 hours, heated to 160° C. over 20 minutes, held for 1 hour at 160° C. and cooled to ambient temperature over about 1 hour. The product was filtered, washed with 200 ml. of n-heptane and dried on the filter for 10 minutes.

0.27 gms. of this product was charged to a 7 oz. soda pop bottle, 50 ml. of n-heptane was added and the bottle was capped. 10.41 gms. of propylene were charged followed by 13 ml. of 25% diethylaluminum chloride solution in n-heptane. The system was heated at 70° C. for 16 hours. The product was recovered and de-ashed in hot methanol/HCl solution and vacuum oven dried at 60° C. for 18 hours. The yield was 8.25 gms. of polypropylene, 55% of which was insoluble in hot n-heptane.

EXAMPLE 3

0.12 gms. of the titanium/magnesium product of Example 2 and 100 ml. of n-heptane were charged to a 7 oz. soda pop bottle and capped under argon. 0.14 ml. of 25% triethylaluminum solution in n-heptane was injected into the bottle and the system was heated to 150° C. over 20 minutes, held for 1 hour at 150° C., and cooled slowly to ambient temperature. The system was then heated to 60° C., pressurized at 36 psig with ethylene, and 1 ml. of 25% triethylaluminum solution in n-heptane was injected into the bottle. The system was agitated with a magnetic spin bar and the ethylene pressure was maintained at 36 psig for 1 hour. The product was recovered in hot methanol/HCl solution, washed with methanol, and dried for 18 hours at 50° C. under reduced pressure. Despite the poor agitation, a yield of 5.21 gms. of polyethylene was obtained.

EXAMPLE 4

Chrysotile organosilicon polymer, 2 gm., was dispersed in 75 ml. of neat silicon tetrachloride under an inert atmosphere, and the suspension was heated for 300 hours at 70° C. The solid was recovered by filtration and washed with 700 ml. of n-heptane. 1.5 gm. of the solid was then suspended in 50 ml. of n-heptane, 5 ml. of a 2.7 M solution of n-butyl magnesium chloride in tetrahydrofuran were added, and the mixture was heated for 96 hours at 70° C. The product was recovered by filtration and washed with 450 ml. of n-heptane. The solid was re-suspended in 50 ml. of n-heptane and 1.25 ml. of titanium tetrachloride were added. The mixture was heated to 160° C. in 1 hour, held for 1 hour at 160° C., and cooled to ambient temperature. The product was recovered by filtration, washed with 450 ml. of n-heptane, and re-suspended in 50 ml. of n-heptane. To the suspension was added 7 ml. of a 25% solution of diethyl aluminum chloride in n-heptane. The suspension was heated in 1 hour to 160° C., held for 1 hour at 160° C., and cooled to ambient temperature. The product was recovered by filtration, washed with 450 ml. of n-heptane, and re-suspended in 50 ml. of n-heptane containing 1 ml. of titanium tetrachloride. The suspension was heated to 160° C. in 1 hour, held for 1 hour at 160° C., and cooled to ambient temperature. The solid was recovered by filtration and washed with 450 ml. of n-heptane. The solid catalyst was 1.3% Ti, 1.4% Mg, 0.7% Al and 3.4% Si by weight.

A 7 oz. soda pop bottle was charged with 0.4 gm. of the above catalyst ($1.1 \times 10^{31\alpha}$ gm-atom Ti) and 50 ml. of n-heptane under an inert atmosphere, and capped with a crown cap. 12.79 gm. (0.29 mole) of propylene were injected through the cap septum, and the system was cooled to approximately $-78°$ C. The catalyst was activated with 1.0 ml. of a 25% solution of triethylaluminum in n-heptane. The system was then allowed to polymerize for 25 minutes at 70° C. The catalyst was destroyed by injecting 3 ml. of methanol acidified with hydrochloric acid. The unreacted propylene was vented and the polymer was recovered and dried at 50° C. under reduced pressure. The yield was 7.6 gm. of polypropylene, 50% of which was insoluble in hot n-heptane.

Although only a few embodiments of the present invention have been specifically described, it should be appreciated that many additions and modifications can be made without departing from the spirit and scope of the invention. These and all other modifications are intended to be included within the scope of the present invention, which is to be limited only by the following claims.

We claim:

1. A catalyst comprising a Ziegler-type transition metal complex and a planar organosilicon polymer support derived from at least one of chrysotile and apophyllite.

2. The catalyst of claim 1 wherein the organo-silicon polymer support is derived from chrysotile.

3. The catalyst of claim 1 wherein the organo-silicon polymer support is derived from apophyllite.

4. The catalyst of claim 1 wherein the Ziegler-type transition metal complex contains titanium.

5. The catalyst of claim 1 wherein the organo-silicon polymer support is treated with at least one of C., Si, Ge, Sn, Pb, P, As, Sb and Bi chloride prior to contacting said support with the Ziegler-type transition metal complex.

6. The catalyst of claim 5 wherein the organo-silicon polymer support is treated with at least one of Si, Sb and As chloride.

7. The catalyst of claim 6 wherein the organo-silicon polymer support is treated with $SiCl_4$.

* * * * *